S. S. BURR.

FOLDING BEDSTEAD.

No. 10,225. Reissued Oct. 31, 1882.

WITNESSES

Wm A. Skinkle

Geo. W. Young

INVENTOR

Sanford S. Burr

By his Attorney

Marcellus Bailey

N. PETERS, Photo-Lithographer, Washington, D.C.

UNITED STATES PATENT OFFICE.

SANFORD S. BURR, OF WINNETKA, ILLINOIS.

FOLDING BEDSTEAD.

SPECIFICATION forming part of Reissued Letters Patent No. 10,225, dated October 31, 1882.

Original No. 261,305, dated July 18, 1882. Application for reissue filed October 2, 1882.

*To all whom it may concern:*

Be it known that I, SANFORD S. BURR, of Winnetka, Illinois, have invented certain new and useful Improvements in Folding Bedsteads, of which the following is a specification.

My invention relates to that class of folding bedsteads generally known as "wardrobe-bedstead"—that is to say, bedsteads having a hinged bed capable of being turned up into a case or into upright position when not in use. The hinged bed usually has combined with or applied to it weights or springs, which serve to counterbalance the weight of the bed when it is being turned up or down. These appliances are necessary; but they are open to the objection that they render it difficult at the start to draw down the bed, and that they also cause the bed to close or fold up too rapidly and forcibly, unless care be taken to hold back the bed by hand.

It is my object to provide means whereby the bed may be more easily managed and manipulated under these circumstances. To this end I combine with the hinged bed an independently-hinged front, connected with the bed by means which will permit the front to turn down some little distance independently of the bed. The front in this position serves both as a weight and as a lever, which is conveniently placed for use, and acts through its connection with the bed to start and draw down the latter from its upright position. It also serves equally as a means by which the bed when it is lifted can be held from closing too forcibly.

The nature of my improvement and the manner in which the same is or may be carried into effect will be readily understood by reference to the accompanying drawings, in which—

Figure 1:
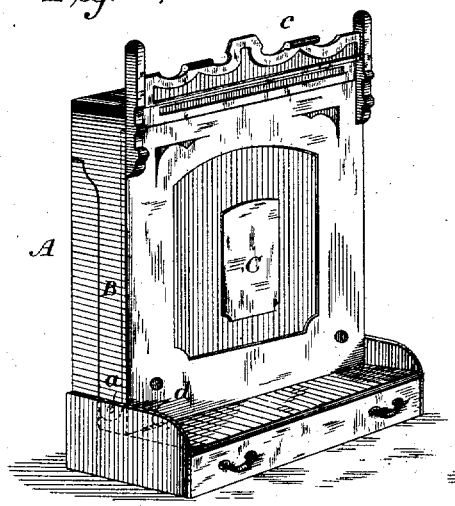
Figure 2:
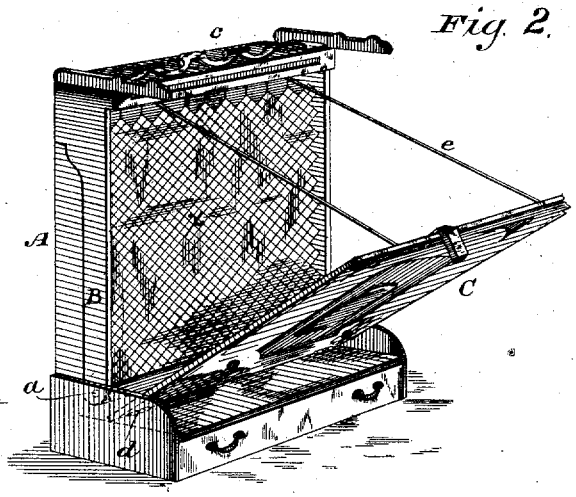
Figure 3:
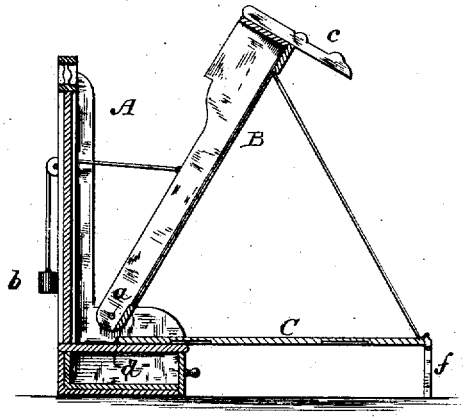
Figure 4:
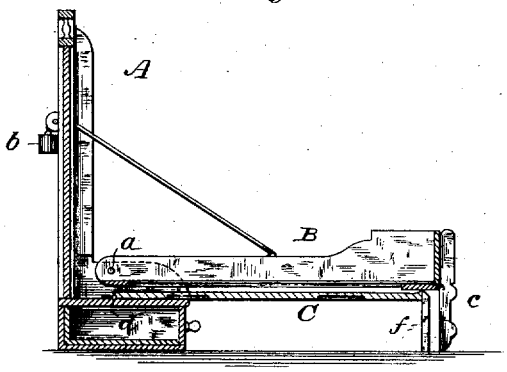

Figure 1 is a perspective view of a wardrobe-bedstead in folded condition containing my improvements. Fig. 2 is a like view of the same with the front partly unfolded or lowered. Fig. 3 is a sectional view representing the bed partly lowered and the front completely lowered. Fig. 4 is a sectional view representing both bed and front completely unfolded or lowered.

A is the case or frame, of ordinary or suitable construction.

B is the bed, hinged to the case at the point *a*, provided with the usual counter-weights, *b*, and the hinged leg-frame *c*, which, when turned up, as indicated in Fig. 1, constitutes the head-piece of the wardrobe-front.

There is nothing essentially novel in the parts thus far described.

The hinged front hereinbefore referred to is shown at C. It may be hinged to any suitable part of the case or bed. In the present instance, in order to allow play for the spring bed-bottom *x*, it is hinged to the lower part of the case at a point, *d*, below the point *a*, at which the bed B is hinged, a space between the front and the bed being thus afforded when the two are unfolded for the play of the bed-bottom, as indicated in Fig. 4. The front C, at a point above its hinge, is connected to the bed by a device which will permit the front to move or vibrate on its hinge to a certain extent independently of the bed, said device, in the present instance, consisting of cords *e*, connected on the one hand to the upper end of the bed and on the other hand to the upper end of the front. The front, when the bedstead is folded up, stands upright and constitutes the front of the wardrobe, as indicated in Fig. 1.

The action is as follows: When it is desired to lower the bed the front is opened and pulled down. Until it reaches the position indicated in Fig. 2, in which the cords *e* are taut, it exercises no influence on the bed; but in this position it acts as a weight to lessen the labor of starting the bed, and will, if made sufficiently heavy, serve to materially assist in lowering it. When it is pulled farther down, after reaching that position, it draws on the bed through the intermediary of the cords *e*, and acts as a lever to pull down the bed until it reaches its lowest position, as indicated in Fig. 3, by which time the bed has been so far turned down as to render it easy to lower it. The front in this position is supported by a hinged leg, *f*, attached to it, which can be folded up out of the way when the front is lifted. The person opening the bedstead then takes hold of the bed and lowers it from the position shown in Fig. 3 to that represented in Fig. 4, in which latter position it is supported and upheld by the legs of the frame *c*. To close or fold up the bed, reverse operation is gone through with. The bed is lifted to the position shown in Fig.

3, in which position it requires but little, if any, further lifting-power applied to it in order to bring it to upright position, and the operator, as the bed closes, prevents it from shutting up too forcibly and quickly by pressing down on the front. As soon as the bed is in the upright position shown in Fig. 2 the front is raised and closed, as indicated in Fig. 1.

I have before stated that the front can, if desired, be hinged to the bed instead of the case.

I would also state that, in lieu of using a front such as represented, I can use any other hinged appliances—as, for instance, a bar or other device connected to the bed, substantially as hereinbefore described, so as to be adapted to serve as a lever to draw or pull down the bed.

I also state that I do not restrict myself to the use of cords to connect the front and the bed, for other connecting media which will permit the partial independent movement of the front to and from the bed, substantially as hereinbefore described, can manifestly be used without departure from my invention.

What I claim as new and of my invention is—

1. The combination, with the counterweighted folding bed and support or case to which the same is hinged, of a folding front or its equivalent, hinged to said case or bed and connected to the bed, substantially in the manner hereinbefore described, so that it may turn or vibrate upon its hinge to a certain extent independently of the bed, as and for the purposes set forth.

2. The combination of the case, the counterweighted bed hinged thereto, and the front, hinged also to the case at a point below the bed-hinge and connected to the bed, substantially as and for the purposes hereinbefore set forth.

In testimony whereof I have hereunto set my hand.

SANFORD S. BURR.

Witnesses:
WILLIAM HAYDEN,
H. LAMBERTON.